United States Patent
Houel et al.

(10) Patent No.: US 8,387,367 B2
(45) Date of Patent: Mar. 5, 2013

(54) REDUCING COKING OVER AG/AL$_2$O$_3$ HC-SCR CATALYST

(75) Inventors: Valerie Marie Renee Houel, Royston (GB); Raj Rao Rajaram, Slough (GB); Athanasios Tsolakis, Bromsgrove (GB)

(73) Assignee: Johnson Matthey Public Limited Company, London (GB)

( * ) Notice: Subject to any disclaimer, the term of this patent is extended or adjusted under 35 U.S.C. 154(b) by 656 days.

(21) Appl. No.: 12/084,997

(22) PCT Filed: Nov. 9, 2006

(86) PCT No.: PCT/GB2006/050376
§ 371 (c)(1),
(2), (4) Date: Dec. 21, 2009

(87) PCT Pub. No.: WO2007/054740
PCT Pub. Date: May 18, 2007

(65) Prior Publication Data
US 2010/0205935 A1    Aug. 19, 2010

(30) Foreign Application Priority Data
Nov. 14, 2005   (GB) .................................. 0523135.2

(51) Int. Cl.
*F01N 3/00*   (2006.01)

(52) U.S. Cl. ................. 60/285; 60/274; 60/278; 60/286; 60/297; 60/301; 60/303

(58) Field of Classification Search ............ 60/274, 60/278, 285, 286, 295, 301, 303
See application file for complete search history.

(56) References Cited

U.S. PATENT DOCUMENTS
3,857,921 A   12/1974  Tamura et al.
5,491,120 A    2/1996  Voss et al.
(Continued)

FOREIGN PATENT DOCUMENTS
DE    103 31 393 A1   2/2005
EP    0 577 438 A2    1/1994
(Continued)

OTHER PUBLICATIONS
Breen et al., "An investigation of the thermal stability and sulphur tolerance of Ag/γ-Al$_2$O$_3$ catalysts for the SCR and NO$_x$ with hydrocarbons and hydrogen," *Applied Catalysis B: Environmental*, vol. 70, Issues 1-4, Jan. 31, 2007, pp. 36-44.

(Continued)

*Primary Examiner* — Thomas Denion
*Assistant Examiner* — Diem Tran
(74) *Attorney, Agent, or Firm* — RatnerPrestia (57) ABSTRACT

The present invention relates to a method of reducing coking over a Ag/Al$_2$O$_3$ hydrocarbon selective catalytic reduction catalyst in an exhaust stream of a lean burn internal combustion engine, the exhaust stream including hydrocarbon and NO$_x$. The method includes controlling the hydrocarbon to molar NO$_x$ ratio of the exhaust stream so as to be within certain limits at certain temperatures. An exhaust system for a lean burn engine suited to the above method, and a lean burn internal combustion engine, or a vehicle or stationary power source including such an exhaust system are also included.

20 Claims, 6 Drawing Sheets

U.S. PATENT DOCUMENTS

| | | | |
|---|---|---|---|
| 5,534,237 | A | 7/1996 | Yoshida et al. |
| 5,586,433 | A | 12/1996 | Boegner et al. |
| 5,593,933 | A | 1/1997 | Chattha et al. |
| 6,199,372 | B1 | 3/2001 | Wakamoto |
| 6,311,484 | B1 * | 11/2001 | Roth et al. .................. 60/301 |
| 6,314,722 | B1 | 11/2001 | Matros et al. |
| 6,508,057 | B1 | 1/2003 | Bouchez et al. |
| 7,396,517 | B2 * | 7/2008 | Lee .................. 423/213.2 |
| 2001/0005988 | A1 | 7/2001 | Russell |
| 2005/0101473 | A1 | 5/2005 | Marshall et al. |
| 2005/0103099 | A1 | 5/2005 | van Nieuwstadt et al. |
| 2005/0129601 | A1 | 6/2005 | Li et al. |
| 2006/0039843 | A1 | 2/2006 | Patchett et al. |
| 2006/0156709 | A1 | 7/2006 | Twigg et al. |
| 2007/0269353 | A1 | 11/2007 | Li et al. |

FOREIGN PATENT DOCUMENTS

| | | |
|---|---|---|
| EP | 0 577 438 A3 | 1/1994 |
| EP | 0 658 368 A1 | 6/1995 |
| EP | 0 671 208 A1 | 9/1995 |
| EP | 0 714 693 A1 | 6/1996 |
| EP | 0 761 289 A2 | 3/1997 |
| EP | 0 761 289 A3 | 3/1997 |
| EP | 0 947 235 A1 | 10/1999 |
| EP | 0 971 102 A2 | 1/2000 |
| EP | 0 971 102 A3 | 1/2000 |
| EP | 1 008 379 A1 | 6/2000 |
| EP | 1 033 161 B1 | 9/2000 |
| EP | 1 264 978 A2 | 12/2002 |
| EP | 1 264 978 A3 | 12/2002 |
| EP | 1 365 119 A2 | 11/2003 |
| EP | 1 365 119 A3 | 11/2003 |
| EP | 1 475 140 A1 | 11/2004 |
| EP | 1 553 269 A1 | 7/2005 |
| GB | 2 236 493 A | 4/1991 |
| GB | 2 238 486 A | 6/1991 |
| GB | 2 374 559 A | 10/2002 |
| JP | 2000-64827 A | 2/2000 |
| JP | 2001-113134 A | 4/2001 |
| JP | 2001-115825 A | 4/2001 |
| JP | 2002-370031 A | 12/2002 |
| WO | WO-01/56686 A1 | 8/2001 |
| WO | WO-02/16014 A1 | 2/2002 |
| WO | WO-03/031780 A1 | 4/2003 |
| WO | WO-2004/022229 A1 | 3/2004 |
| WO | WO-2005/016496 A1 | 2/2005 |
| WO | WO-2007/007107 A1 | 1/2007 |

OTHER PUBLICATIONS

Hickey et al., "Improvement of $SO_x$-Resistance of Silver Lean-$DeNO_x$ Catalysts by Supporting on $CeO_2$-Containing Zirconia,"*Journal of Catalysis*, vol. 209, Issue 1, Jul. 1, 2002, pp. 271-274.

Klingstedt et al., "A highly active Ag/alumina catalytic converter for continuous HC-SCR during lean-burn conditions: from laboratory to full-scale vehicle tests," *Topics in Catalysis*, vol. 30-31, No. 1, Jul. 2004, pp. 27-30.

König et al., "Lean-burn catalysts from the perspective of a car manufacturer. Early work at Volkswagen Research," *Topics in Catalysis*, vol. 28, Nos. 1-4, Apr. 2004, pp. 99-103.

Lindfors et al., "Silver/alumina catalyst for selective catalytic reduction of $NO_x$ to $N_2$ by hydrocarbons in diesel powered vehicles," *Topics in Catalysis*, vol. 28, Nos. 1-4, Apr. 2004, pp. 185-189.

Meunier et al., "Effect of ex situ treatments with $SO_2$ on the activity of a low loading silver-alumina catalyst for the selective reduction of NO and $NO_2$ by propene," *Applied Catalysis B: Environmental*, vol. 30, Issues 1-2, Feb. 26, 2001, pp. 163-172.

Satokawa, "Enhancing the $NO/CH_3H_8/O_2$ Reaction by Using $H_2$ over $Ag/Al_2O_3$ Catalysts under Lean-Exhaust Conditions," *Chemistry Letters*, vol. 29 (2000), No. 3, pp. 294-295.

Shibata et al., "Promotion of effect of hydrogen on surface steps in SCR of NO by propane over alumina-based silver catalyst as examined by transient FT-IR," *Phys. Chem. Chem. Phys.*, 2003, vol. 5, Issue 10, pp. 2154-2160.

Satokawa et al., "Promotion effect of $H_2$ on the low temperature activity of the selective reducton of NO by light hydrocarbons over $Ag/Al_2O_3$," *Applied Catalysis B: Environmental*, vol. 42, Issue 2, May 8, 2003, pp. 179-186.

Trimm et al, "Onboard Fuel Conversion for Hydrogen-Fuel-Cell-Driven Vehicles," *Catalysis Reviews*, vol. 43, Issue 1 & 2, May 2001, pp. s 31-84.

* cited by examiner

REDUCING COKING OVER AG/AL$_2$O$_3$ HC-SCR CATALYST

CROSS-REFERENCE TO RELATED APPLICATIONS

This application is the U.S. National Phase Application of PCT International Application No. PCT/GB2006/050376, filed Nov. 9, 2006, and claims priority of British Patent Application No. 0523135.2, filed Nov. 14, 2005.

FIELD OF THE INVENTION

This invention relates to a method of reducing coking of Ag/Al$_2$O$_3$ hydrocarbon selective catalytic reduction (HC-SCR) catalysts in a lean burn engine exhaust gas stream.

BACKGROUND OF THE INVENTION

HC-SCRs are sometimes also referred to in the literature as non-selective catalytic reduction (NSCR) catalysts, lean NO$_x$ catalysts (LNC), lean NO$_x$ reduction catalysts, "DeNO$_x$ catalysts," and NO$_x$ occluding catalysts.

In hydrocarbon selective catalytic reduction, hydrocarbons (HC) react with nitrogen oxides (NO$_x$), rather than oxygen (O$_2$), to form nitrogen (N$_2$), carbon dioxide (CO$_2$) and water (H$_2$O) according to Reaction (1):

{HC}+NO$_x$→N$_2$+CO$_2$+H$_2$O  (1)

The competitive, non-selective reaction with oxygen is given by Reaction (2):

{HC}+NO$_x$→N$_2$+CO$_2$+H$_2$O  (2)

The most effective HC-SCR catalysts used to selectively promote the desired reaction (1) are Pt/Al$_2$O$_3$, Cu exchanged ZSM-5 and Ag/Al$_2$O$_3$. Ag/Al$_2$O$_3$ catalysts operate at higher temperatures and over a broad temperature range, and have recently shown promise in vehicle testing (Klingstedt et al., Topics in Catalysis, 30/31, 2004, 27 and Lindfors et al., Topics in Catalysis, 28, 2004, 185, the entire contents of which are incorporated herein by reference).

All of these catalysts exhibit high activity for the selective reduction of NO$_x$ by hydrocarbons, including long chain alkane and diesel fuel, but each type of catalyst suffers from some form of limitation in use. Pt/Al$_2$O$_3$ catalysts display lower NO$_x$ conversion and lower selectivity towards nitrogen; N$_2$O (conversion >60%) is a basic product. Additionally, the HC-SCR activity window of Pt/Al$_2$O$_3$ catalysts is limited to low temperatures (about 150-250° C.). Generally speaking, Cu/ZSM-5 catalysts can suffer from thermal deactivation due to copper sintering and dealumination of the zeolite. Ag/Al$_2$O$_3$ catalysts are tolerant to hydrothermal aging, but can suffer from chemical deactivation caused by coking or sulphation. We understand that the relatively poor performance of Pt/Al$_2$O$_3$ catalysts and the relatively poor activity of Cu/ZSM-5 and Ag/Al$_2$O$_3$ HC-SCR catalysts once aged, has so far been insufficient to allow for their widespread implementation (Konig et al., Topics in Catalysis, 28, 2004, 99, incorporated herein by reference).

Coking is not a significant factor in the activity of any HC-SCR catalyst at higher temperatures since above approximately 400° C. any carbon present will be burnt to form CO$_2$ thereby leaving the catalyst surface available for reactions to take place thereon. As such it is important to differentiate between the absolute activity of any particular HC-SCR catalyst, and the reduction in activity that coking may result in. An increase in the absolute activity of any particular HC-SCR catalyst will not necessarily be the result of a concomitant reduction in coking.

Nonetheless, coking does have a significant effect upon the HC-SCR activity of Ag/Al$_2$O$_3$ catalysts at lower temperatures and therefore a means was devised to limit access of the hydrocarbon species responsible for coke deposition to the catalyst to minimise coking deactivation. Said means involved modifying the Ag/Al$_2$O$_3$ catalyst formulation, and is disclosed in WO 2005/016496 (incorporated herein by reference). Specifically, it was disclosed that by combining known HC-SCR catalysts with a partial oxidation catalyst (POC), it was possible to suppress or avoid low temperature coke formation. In the WO 2005/016496 invention, the POC helps to prevent coking by promoting the partial oxidation of hydrocarbons in the exhaust gas of a lean-burn internal combustion engine to carbon monoxide (CO), hydrogen gas (H$_2$) and partially oxygenated hydrocarbon species. Therefore the heavy hydrocarbon species present in the exhaust gas are partially oxidised to smaller, more reactive species prior to contacting the downstream HC-SCR catalyst.

SUMMARY OF THE INVENTION

We have now discovered a new method for reducing coking over a Ag/Al$_2$O$_3$ HC-SCR catalyst without needing to modify catalyst formation by optimising the hydrocarbon to molar NO$_x$ ratio (HC:NO$_x$ as Cl) of the exhaust gas to achieve high NO$_x$ conversion for Ag/Al$_2$O$_3$ HC-SCR catalysts across a wide temperature range.

According to a first aspect, the invention provides a method of reducing coking over a Ag/Al$_2$O$_3$ hydrocarbon selective catalytic reduction (HC-SCR) catalyst in an exhaust stream of a lean burn internal combustion engine, which exhaust stream comprising hydrocarbon and NO$_x$, which method comprising controlling the hydrocarbon to molar NO$_x$ ratio of the exhaust stream so as to be less than or equal to 2.0 when the exhaust stream temperature is less than or equal to 300° C., between 2.0 and 4.5 when the exhaust stream temperature is from 300° C. to 425° C., and 4.5 or greater when the exhaust stream temperature is greater than or equal to 425° C. The temperature of the exhaust stream relevant to this invention is the temperature of the exhaust stream as it impacts the HC-SCR catalyst.

According to a second aspect, this invention provides an exhaust system for a lean burn engine, which system comprises a Ag/Al$_2$O$_3$ HC-SCR catalyst and means, when in use, for controlling the HC:NO$_x$ ratio of the exhaust gas so as to be less than or equal to 2.0 when the exhaust stream temperature is less than or equal to 300° C., between 2.0 and 4.5 when the exhaust stream temperature is from 300° C. to 425° C., and 4.5 or greater when the exhaust stream temperature is greater than or equal to 425° C.

According to further aspects, the invention provides a lean burn internal combustion engine including an exhaust system according to the invention, and a vehicle or stationary power source including such a lean burn engine.

BRIEF DESCRIPTION OF THE DRAWINGS

In order that the invention may be more fully understood, the Examples below are provided by way of illustration only and with reference to the accompanying drawings, in which.

DETAILED DESCRIPTION OF THE INVENTION

Figure 1:
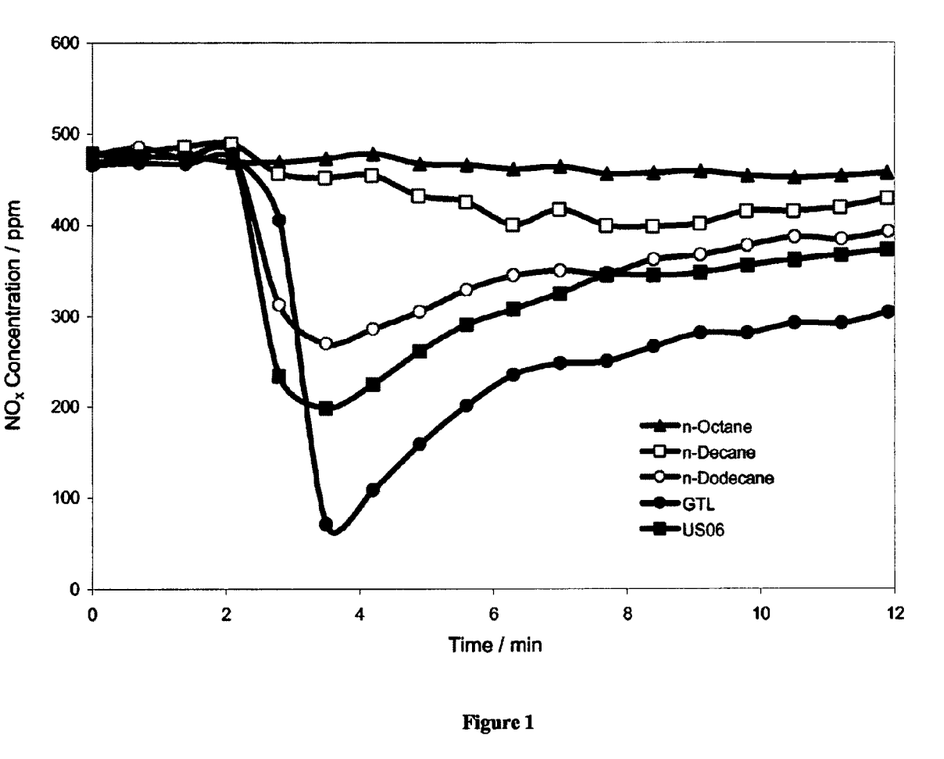
FIG. 1 shows how NO$_x$ conversion activity at 250° C. varies with time for different fuels.

In the course of our research we discovered that the selective catalytic reduction of $NO_x$ using hydrocarbons by $Ag/Al_2O_3$ catalysts varies depending upon the hydrocarbon used (see FIG. 1). Short chain alkanes, e.g. octane and decane, show poor $NO_x$ conversion whilst long chain alkanes show good initial activity although this decreases with time due to coking, as explained above.

This connection between the hydrocarbon being used in the selective catalytic reduction of $NO_x$ and activity of $Ag/Al_2O_3$ catalysts led us to investigate how, in addition to varying the $HC:NO_x$ ratio in response to temperature, we might vary the $HC:NO_x$ ratio depending upon the hydrocarbon being used. As a result we found that by varying the $HC:NO_x$ ratio depending upon the aromatics content of the hydrocarbon being used we were able to maintain good high temperature activity and minimise low temperature deactivation through coking. Therefore, in one embodiment the hydrocarbon has a relatively low aromatics species content, e.g. comprising from 0 to 10% aromatics. When this method is applied to hydrocarbon with a relatively low aromatics species content, the $HC:NO_x$ is controlled so as to be between 0.5 and 2.0 when the exhaust gas temperature is less than or equal to 300° C. and between 4.5 and 7.0 when the exhaust gas temperature is greater than or equal to 425° C. In an alternative embodiment the hydrocarbon species has a relatively high aromatics species content, e.g. comprising from 10 to 40% aromatics. When this method is applied to hydrocarbon with a relatively high aromatics species content, the $HC:NO_x$ is controlled so as to be between 1.0 and 2.0 when the exhaust gas temperature is less than or equal to 300° C. and between 4.5 and 5.0 when the exhaust gas temperature is greater than or equal to 425° C.

"Aromatics" as defined herein include, but are not limited to, the following species: toluene, ethylbenzene, xylenes, polaromatics, 1-methylnaphthalene, n-pentylbenzene, biphenyl, 1-butylnaphthalene, n-nonylbenzene, 2-octylnaphthalene and n-tetradecylbenzene.

Controlling the $HC:NO_x$ ratio of the exhaust stream can be achieved by either varying the amount of hydrocarbon present in response to the amount of $NO_x$ present, or by varying the amount of $NO_x$ present in response to the amount of hydrocarbon present. This can be achieved by monitoring the levels of NOx or hydrocarbon present in the exhaust stream, or predicting the levels of $NO_x$ or hydrocarbon present in the exhaust stream. Such levels may be predicted by referring to the $NO_x$ or hydrocarbon levels known to be present during certain engine conditions.

The hydrocarbon for use in the present invention may be injected into the engine exhaust stream upstream of the HC-SCR catalyst, or it may be produced by cracking engine fuel. Engine fuel may be cracked in the cylinder of the engine or in the exhaust gas stream. For further details of ways to crack engine fuel see patent application no. PCT/GB2006/002595 (incorporated herein by reference).

Exhaust Gas Recirculation or fuel combustion techniques, such as HCCI during a relevant portion of the engine speed/load map, may be used to alter the supply of $NO_x$ to the HC-SCR catalyst.

Suitable engine fuels include those that have relatively high aromatics hydrocarbon species content such as diesel (including US06, an Ultra Low Sulphur Diesel-ULSD for implementation in 2007) and gasoline, and those that have relatively low aromatics hydrocarbon species content such as FT-GTL (Fischer-Tropsch gas to liquids) and biodiesel.

One characteristic of $Ag/Al_2O_3$ catalysts is the ability of hydrogen to promote its HC-SCR activity. It has been reported in the literature (Satokawa, Chem. Lett., 2000, 294 and Satokawa et. al., Appl. Cat. B, 42, 2003, 179 and Shibata et. al., Phys. Chem., 5, 2003, 2154, the entire contents of which are incorporated herein by reference) that the role of hydrogen is to activate the $Ag_2O$ clusters present on the alumina or to modify the hydrocarbon species (e.g. by oxygenation) to generate more active species for $NO_x$ reduction. In one embodiment of the present invention the exhaust gas stream also comprises hydrogen. We have found that hydrogen can have an advantageous effect on HC-SCR activity at relatively low levels, e.g. less than 1000 ppm, optionally less than or equal to 600 ppm. Whilst it is possible to increase hydrogen content in an exhaust gas by combusting hydrocarbon fuel, e.g. injected into the exhaust gas upstream of the HC-SCR, or by engine calibration, such an increase in hydrogen is generally accompanied by an increase in hydrocarbon as well. In a particular embodiment, relatively low levels of hydrogen can be introduced into the exhaust gas without simultaneously increasing hydrocarbon content of the exhaust gas by contacting a reforming catalyst with hydrocarbon.

In practice, the $HC:NO_x$ can be controlled by adjusting the HC concentration in the exhaust gas, by adjusting the $NO_x$ concentration in the exhaust gas, or both. In one embodiment, the exhaust system comprises means, when in use, for controlling the supply of the hydrocarbon. Such means can comprise means for injecting hydrocarbon into exhaust gas upstream of the HC-SCR catalyst or for adjusting the timing of fuel injection into one or more engine cylinders. In another embodiment, the exhaust system comprises means, when in use, for controlling the supply of $NO_x$. $NO_x$ control means can comprise Exhaust Gas Recirculation or fuel combustion techniques such as HCCI during a relevant portion of the engine speed/load map. In either of these two embodiments, the control means may include a pre-programmed electronic control unit.

In another embodiment, the exhaust system comprises means for increasing the amount of hydrogen present in the exhaust gas stream. Such means can include a fuel reformer, based on platinum group metals or nickel (see Trimm et al., Catalysis Reviews—Science and Engineering, 43, 2001, 31-84, incorporated herein by reference).

As in the method detailed above, the hydrocarbon species may be injected into the engine exhaust gas stream upstream of the HC-SCR catalyst, or it may be produced by cracking engine fuel, thereby to produce shorter chain hydrocarbons. If the hydrocarbon species is produced by cracking engine fuel, this cracking may be done in the combustion cylinder of the engine or in the exhaust gas stream. Therefore the exhaust system may comprise means for injecting hydrocarbon species into the exhaust gas stream or means for cracking engine fuel in either the combustion cylinder of the engine or in the exhaust gas stream.

EXAMPLES

Example 1

Catalyst Formation 2 wt % $Ag/Al_2O_3$ catalysts were prepared by wet impregnation. Silver nitrate was dissolved in the appropriate amount of water according to the pore volume of the alumina support. The nitrate solution was then added to the support with mixing. After drying overnight, the sample was calcined in air at 500° C. for 2 hours.

Example 2

Testing Conditions

The HC-SCR activity of the catalysts was measured by flowing diesel type fuels (US06 or GTL) in a gaseous mixture (NO 500 ppm, hydrocarbon (C1 equivalent) 2250 ppm, CO 240 ppm, $O_2$ 12%, $H_2O$ 5%, $CO_2$ 4.6%, balance $N_2$ at a total flow rate of 3 L/min) over 0.6 g of catalyst.

$NO_x$ conversions were typically measured after 10 mins at constant catalyst inlet temperature starting from 200° C. and increasing the temperature in 50° C. intervals to 500° C. We refer to this as steady-state $NO_x$ conversion.

Example 3

Effect of Hydrocarbon Used on the Reactivity of 2 Wt % $Ag/Al_2O_3$

FIG. 1 shows the steady state $NO_x$ concentration for hydrocarbon to $NO_x$ ratio of 4.5 for n-octane, n-decane, n-dodecane, GTL and US06 at 250° C. as a function of time. Octane and decane show poor $NO_x$ conversion whilst dodecane shows good initial activity although its high reactivity, relative to GTL and US06, also promotes coke deposition therefore leading to a rapid decrease in reactivity.

Example 4

Effect of $HC:NO_x$ on the Reactivity of 2 Wt % $Ag/Al_2O_3$

The steady state $NO_x$ conversion activity for 2 wt % $Ag/Al_2O_3$ of Example 1 was measured for hydrocarbon to $NO_x$ ratios of 2.5 and 4.5 using GTL and US06 fuel as the source of the hydrocarbon species.

Figure 2:
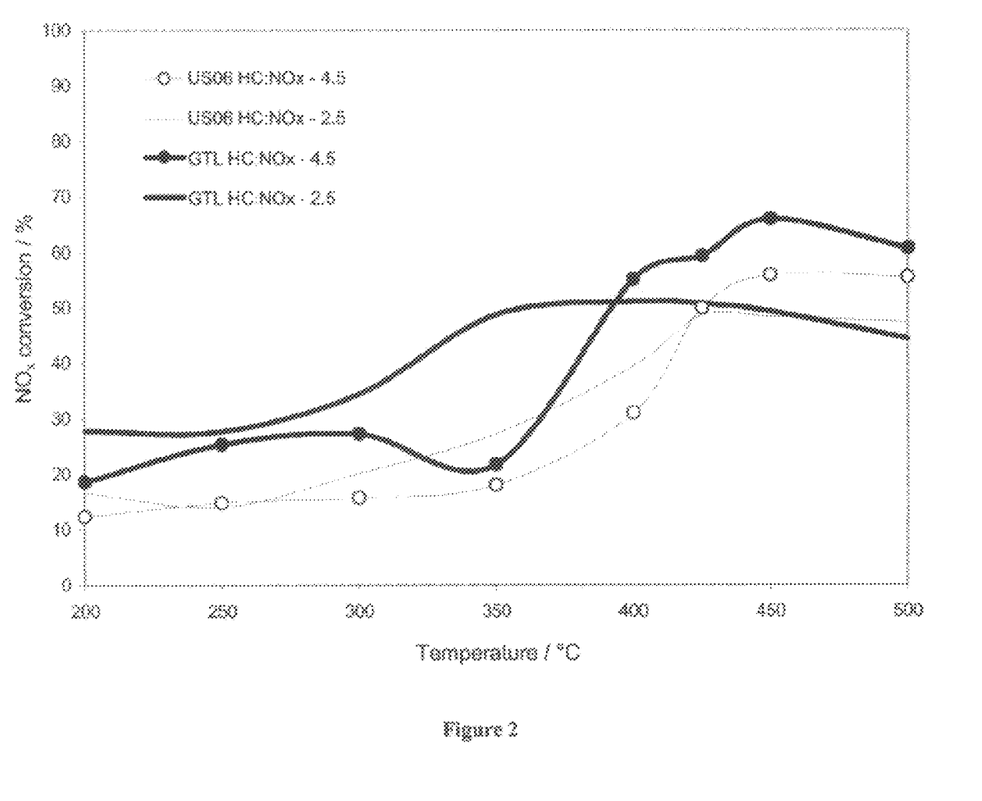
FIG. 2 shows how the steady state $NO_x$ conversion activity varies with temperature for both GTL and US06 fuels at hydrocarbon to $NO_x$ ratios of 2.5 and 4.5.

FIG. 2 shows that the $NO_x$ conversion activity is generally higher for GTL than for US06 and that $NO_x$ conversion is more effective using the lower $HC:NO_x$ at lower temperatures. The difference in performance between GTL and US06 may be partly due to the higher cetane number of GTL relative to US06, see Table 1. Additionally, we believe the improvement in $NO_x$ conversion is due to deactivation through coking occurring at temperatures of less than 400° C. (the 50% distillation temperature of both fuels is approx. 300° C., see Table 1) and less hydrocarbon species being present results in less coking. However, at higher temperatures the higher $HC:NO_x$ is more effective for $NO_x$ conversion.

TABLE 1

| Diesel fuel properties | | | |
|---|---|---|---|
| Fuel Analysis | Method | US06 | GTL |
| Cetane Number | ASTM D613 | 53.9 | 79 |
| Density at 15° C. (kg m$^{-3}$) | ASTM D4052 | 827.1 | 784.6 |
| Viscosity at 40° C. (cSt) | ASTM D445 | 2.467 | 3.497 |
| 50% distillation (° C.) | ASTM D86 | 264 | 295.2 |
| 90% distillation (° C.) | ASTM D86 | 329 | 342.1 |
| LCV (MJ kg$^{-1}$) | | 42.7 | 43.9 |
| Sulphur (mg kg$^{-1}$) | ASTM D2622 | 46 | 0.05 |
| AROMATICS (wt %) | | 24.4 | 0.3 |
| C (% wt) | | 86.5 | 85 |
| H (% wt) | | 13.5 | 15 |
| O (% wt) | | — | — |
| H/C Ratio (Molar) | | 1.88 | 2.10 |

Figure 3:
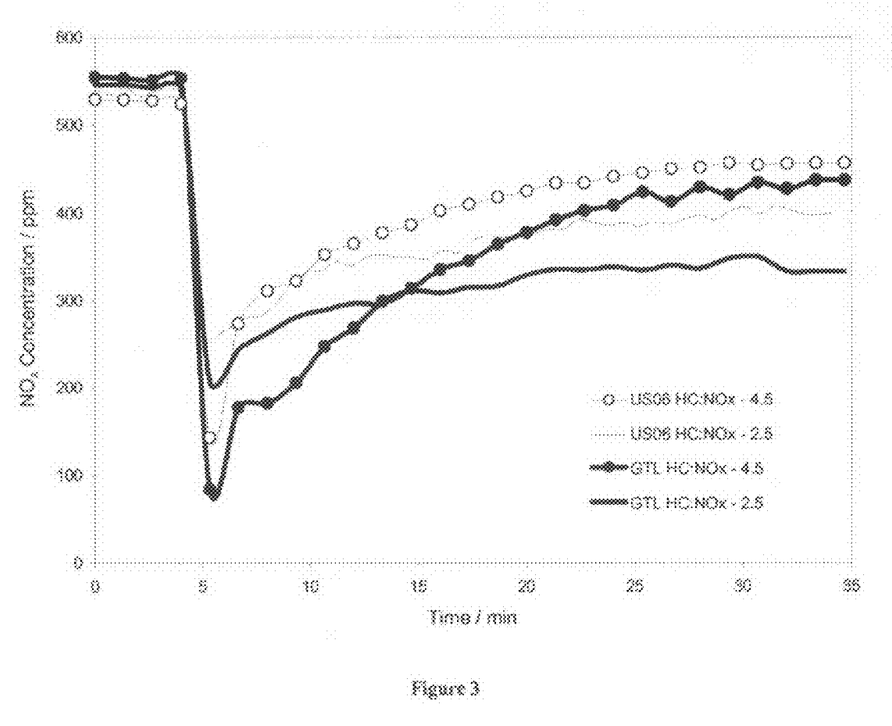
FIG. 3 shows how $NO_x$ conversion activity at 300° C. varies with time for both GTL and US06 fuels at hydrocarbon to $NO_x$ ratios of 2.5 and 4.5.

FIG. 3 shows the steady state $NO_x$ concentration for hydrocarbon to $NO_x$ ratios of 2.5 and 4.5 for GTL and US06 at 300° C. as a function of time. Although initial $NO_x$ conversion was lower when the $HC:NO_x$ ratio was reduced from 4.5 to 2.5 the rate of catalyst deactivation was also lower at the low $HC:NO_x$, such that after 30 minutes the $NO_x$ conversion was higher for the $HC:NO_x$=2.5 samples.

Figure 4:
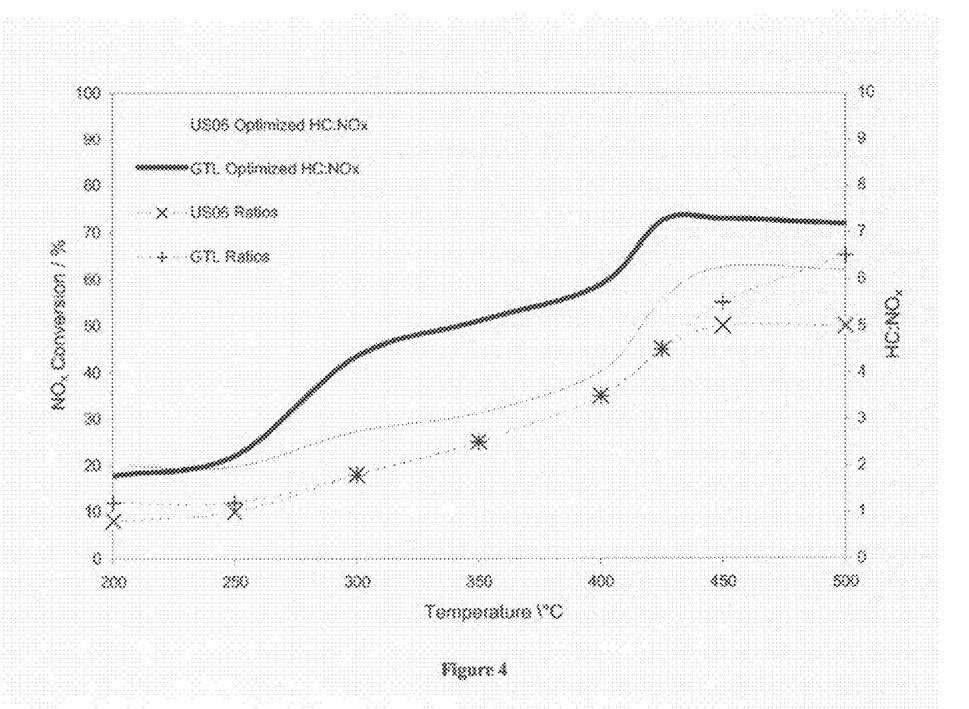
FIG. 4 shows how the steady state $NO_x$ conversion activity varies with temperature for both GTL and US06 fuels at optimised hydrocarbon to $NO_x$ ratios.

FIG. 4 shows the $NO_x$ conversion activity for optimised hydrocarbon to $NO_x$ ratios for US06 and GTL fuels. (By optimised we mean that the $HC:NO_x$ was increased, in accordance with the invention, as the temperature of the exhaust stream increased.) The variable ratios for the two sources of hydrocarbon are also given, see right hand axis. These results show that optimisation of $HC:NO_x$ improves the HC-SCR activity across the whole temperature window.

Example 5

Effect of Hydrogen on the Reactivity of 2 Wt % $Ag/Al_2O_3$

The steady state $NO_x$ conversion activity for 2 wt % $Ag/Al_2O_3$ of Example 1 with either 300 ppm or 600 ppm $H_2$ present in the gaseous mixture was measured for optimised hydrocarbon to $NO_x$ ratios using US06 fuel as the source of the hydrocarbon species.

Figure 5:
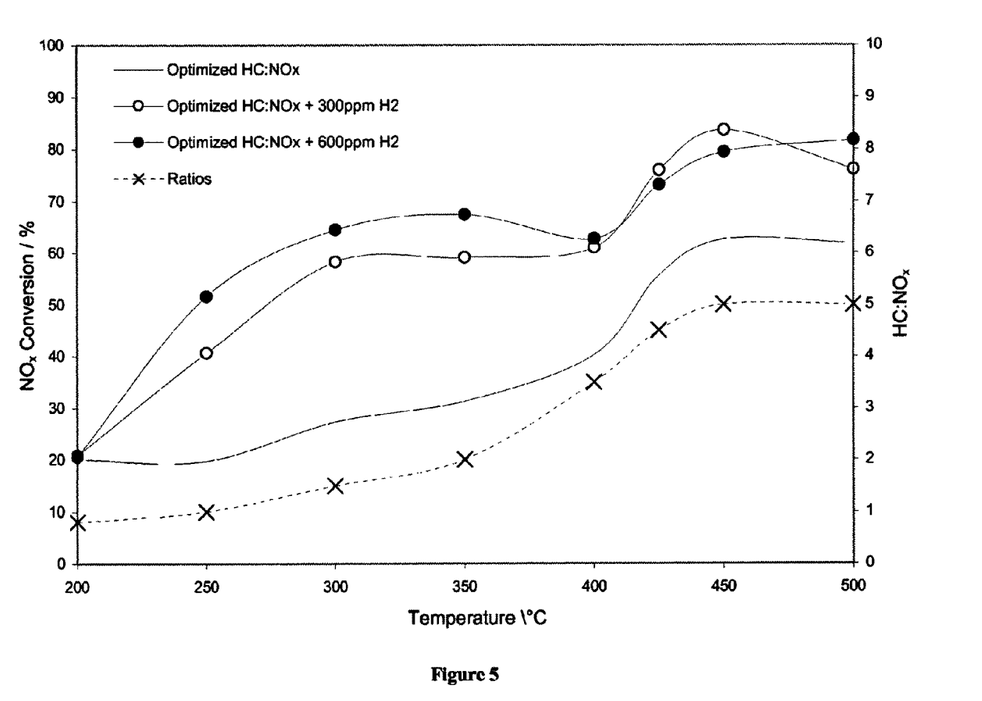
FIG. 5 shows how the steady state $NO_x$ conversion activity of US06 fuel (at optimised hydrocarbon to $NO_x$ ratios) varies with temperature with either 300 ppm or 600 ppm $H_2$ present in the gaseous mixture.

FIG. 5 shows significant improvements in the HC-SCR catalyst activity results from the addition of $H_2$ with the activity window broadening towards lower temperatures, even at low levels of $H_2$ addition.

Similar results were obtained using GTL fuel as the source of the hydrocarbon species.

Example 6

Effect of $NO_x$ Levels on the Reactivity of 2 Wt % A $Ag/Al_2O_3$

The 300 ppm $H_2$ test from Example 5 was repeated using a gas mixture containing 200 ppm $NO_x$, and with the amount of US06 present adjusted to maintain optimised hydrocarbon to $NO_x$ ratios.

Figure 6:
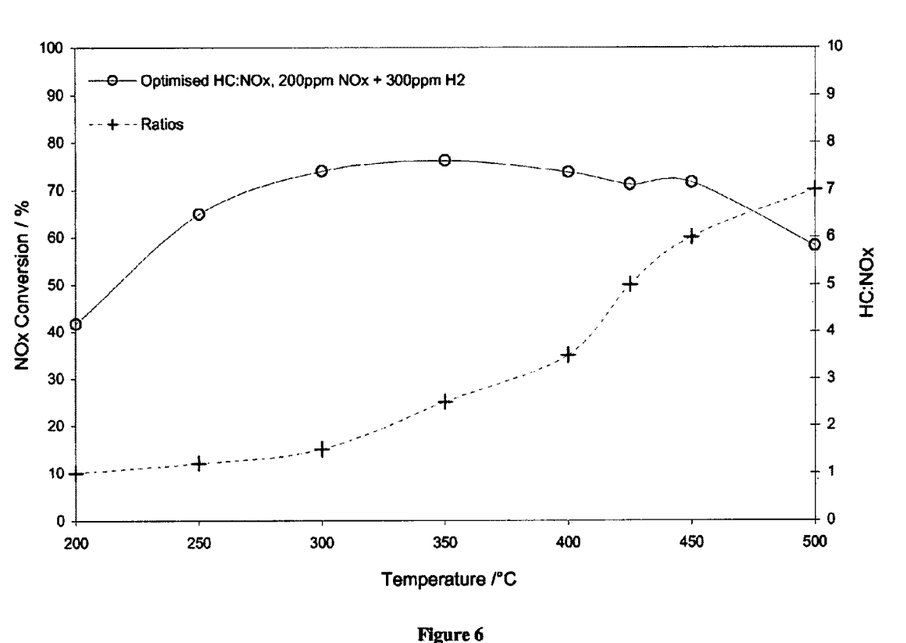
FIG. 6 shows how the steady state $NO_x$ conversion activity of US06 fuel (at optimised hydrocarbon to $NO_x$ ratios) varies with temperature with 300 ppm $H_2$ present in the gaseous mixture at low levels of $NO_x$.

FIG. 6 shows that the HC-SCR catalyst is highly effective at low levels of $NO_x$, as well as at higher levels of $NO_x$.

The invention claimed is:

1. A method of reducing coking over a $Ag/Al_2O_3$ hydrocarbon selective catalytic reduction (HC-SCR) catalyst in an exhaust stream of a lean burn internal combustion engine, which exhaust stream comprising hydrocarbon and $NO_x$, said method comprising controlling the hydrocarbon to molar $NO_x$ ratio ($HC:NO_x$) of the exhaust stream so as to be less than or equal to 2.0 when the exhaust stream temperature is less than or equal to 300° C., between 2.0 and 4.5 when the exhaust stream temperature is from 300° C. to 425° C., and 4.5 or greater when the exhaust stream temperature is greater than or equal to 425° C.

2. A method according to claim 1, further comprising the step of monitoring the amount of $NO_x$ present in the exhaust stream and wherein the controlling step comprises altering the amount of hydrocarbon present in the exhaust stream in response thereto.

3. A method according to claim 1, further comprising the step of predicting the amount of $NO_x$ present in the exhaust stream based on engine performance and wherein the controlling step comprises altering the amount of hydrocarbon present in the exhaust stream in response thereto.

4. A method according to claim 1, further comprising the step of monitoring the amount of hydrocarbon present in the exhaust stream and wherein the controlling step comprises altering the amount of $NO_x$ present in the exhaust stream in response thereto.

5. A method according to claim 1, further comprising the step of predicting the amount of hydrocarbon present in the exhaust stream based on engine performance and wherein the controlling step comprises altering the amount of $NO_x$ present in the exhaust stream in response thereto.

6. A method according to claim 1, wherein the controlling step comprises the step of injecting the hydrocarbon into the engine exhaust stream upstream of the HC-SCR catalyst.

7. A method according to claim 1, wherein the hydrocarbon comprises from 0 to 10% aromatics species.

8. A method according to claim 7, wherein the controlling step comprises controlling HC:$NO_x$ so as to be between 0.5 and 2.0 when the exhaust stream temperature is less than or equal to 300° C. and between 4.5 and 7.0 when the exhaust stream temperature is greater than or equal to 425° C.

9. A method according to claim 7, further comprising the step of producing a hydrocarbon species by cracking engine fuel in either the combustion cylinder of the engine or in the exhaust stream.

10. A method according to claim 1, wherein the hydrocarbon comprises from 10 to 40% aromatics species.

11. A method according to claim 10, wherein the controlling step comprises controlling HC:$NO_x$ so as to be between 1.0 and 2.0 when the exhaust stream temperature is less than or equal to 300° C. and between 4.5 and 5.0 when the exhaust stream temperature is greater than or equal to 425° C.

12. A method according to claim 1, wherein the exhaust stream also comprises hydrogen.

13. A method according to claim 12, wherein the hydrogen is present at less than 1000 ppm.

14. An exhaust system for a lean burn internal combustion engine, said system comprising a Ag/$Al_2O_3$ HC-SCR catalyst and means, when in use, for controlling the HC:$NO_x$ ratio of the exhaust stream so as to be less than or equal to 2.0 when the exhaust stream temperature is less than or equal to 300° C., between 2.0 and 4.5 when the exhaust stream temperature is from 300° C. to 425° C., and 4.5 or greater when the exhaust stream temperature is greater than or equal to 425° C.

15. An exhaust system according to claim 14, wherein the means for controlling the HC:$NO_x$ ratio comprise means, when in use, for controlling the supply of the hydrocarbon.

16. An exhaust system according to claim 15, wherein the means for controlling the supply of the hydrocarbon comprises means for injecting hydrocarbon species into the exhaust stream or means for adjusting the timing of fuel injection into one or more engine cylinder.

17. An exhaust system according to claim 14, wherein the means for controlling the HC:$NO_x$ ratio comprise means, when in use, for controlling the supply of $NO_x$.

18. An exhaust system according to claim 17, wherein the means for controlling the supply of $NO_x$ comprises Exhaust Gas Recirculation or fuel combustion.

19. An exhaust system according to claim 14, further comprising means for increasing the amount of hydrogen present in the exhaust stream.

20. An exhaust system according to claim 19, further comprising means for introducing hydrogen into the exhaust stream without simultaneously increasing hydrocarbon content of the exhaust stream by contacting a hydrocarbon with a reforming catalyst.

* * * * *